(12) United States Patent
Lee et al.

(10) Patent No.: US 12,280,852 B2
(45) Date of Patent: Apr. 22, 2025

(54) BICYCLE CRANK ARM

(71) Applicant: SRAM, LLC, Chicago, IL (US)

(72) Inventors: Hong-Chou Lee, Taichung (TW);
Chen-Hsiung Chen, Taichung (TW);
En-Chieh Chen, Taichung (TW);
Joachim Stuermer, Schweinfurt (DE)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/954,043

(22) Filed: Sep. 27, 2022

(65) Prior Publication Data
US 2023/0111794 A1 Apr. 13, 2023

Related U.S. Application Data

(60) Provisional application No. 63/254,647, filed on Oct. 12, 2021.

(51) Int. Cl.
*B62M 3/00* (2006.01)
*B62M 1/36* (2013.01)

(52) U.S. Cl.
CPC .............. *B62M 3/00* (2013.01); *B62M 1/36* (2013.01)

(58) Field of Classification Search
CPC ............ B62M 3/08; B62M 3/00; B62M 1/36
See application file for complete search history.

(56) References Cited

U.S. PATENT DOCUMENTS

| | | | |
|---|---|---|---|
| 4,811,626 A | 3/1989 | Bezin | |
| 5,456,481 A * | 10/1995 | Allsop | B29C 45/006 280/281.1 |
| 5,493,937 A | 2/1996 | Edwards | |
| 5,632,940 A | 5/1997 | Whatley | |
| 5,941,135 A | 8/1999 | Schlanger | |
| 6,079,294 A | 6/2000 | Mizobe | |
| 6,145,184 A | 11/2000 | Yamanaka | |
| 6,202,506 B1 | 3/2001 | Storck et al. | |
| 6,305,243 B1 | 10/2001 | Chiang | |
| 6,314,834 B1 | 11/2001 | Smith et al. | |
| 6,443,033 B1 | 9/2002 | Brummer | |
| 6,508,146 B2 | 1/2003 | Kang | |
| 6,543,308 B2 | 4/2003 | Harrington | |
| 6,564,675 B1 | 5/2003 | Jiang | |
| 7,263,914 B2 | 9/2007 | Ording et al. | |
| 7,360,470 B2 * | 4/2008 | Bonner | B62M 3/00 74/594.1 |
| 8,024,993 B2 * | 9/2011 | Dal Pra | B29C 70/16 74/594.1 |
| 9,527,548 B2 | 12/2016 | Malloy | |
| 11,649,850 B2 * | 5/2023 | Funck | F16D 1/06 384/280 |
| 2001/0049976 A1 | 12/2001 | Dodman | |

(Continued)

FOREIGN PATENT DOCUMENTS

| CN | 2509074 Y | 9/2002 |
|---|---|---|
| CN | 101028852 | 9/2007 |

(Continued)

*Primary Examiner* — Vinh Luong

(57) ABSTRACT

A bicycle crank may include a first lug, a second lug and a transition region. The first lug is for connecting a spindle. The second lug is for connecting a pedal. The transition region interconnects the first lug and the second lug, and is formed from a fiber reinforced thermoplastic material that includes a fiber component and a thermoplastic component.

17 Claims, 16 Drawing Sheets

(56) References Cited

U.S. PATENT DOCUMENTS

| | | | |
|---|---|---|---|
| 2003/0019324 A1 | 1/2003 | Valle | |
| 2003/0019325 A1 | 1/2003 | Valle | |
| 2003/0037638 A1 | 2/2003 | Dal Pra' | |
| 2003/0061900 A1 | 4/2003 | Smith | |
| 2003/0066383 A1 | 4/2003 | Jiang | |
| 2004/0182197 A1 | 9/2004 | Chiang | |
| 2013/0087011 A1 | 4/2013 | Yamanaka | |
| 2014/0182393 A1* | 7/2014 | Heinkel | G01L 3/242 |
| | | | 73/862.28 |
| 2015/0000459 A1* | 1/2015 | Nonoshita | B62M 3/00 |
| | | | 74/594.1 |
| 2015/0266541 A1* | 9/2015 | Faupel | B29C 45/0005 |
| | | | 74/594.1 |
| 2022/0234307 A1 | 7/2022 | Escowitz | |
| 2023/0014123 A1* | 1/2023 | Andrew | B62M 3/08 |

FOREIGN PATENT DOCUMENTS

| | | |
|---|---|---|
| CN | 200995764 Y | 12/2007 |
| CN | 104724242 | 6/2015 |
| CN | 107792286 | 3/2018 |
| TW | 200800719 | 1/2008 |
| TW | 201529406 | 8/2015 |
| TW | M512540 U | 11/2015 |

* cited by examiner

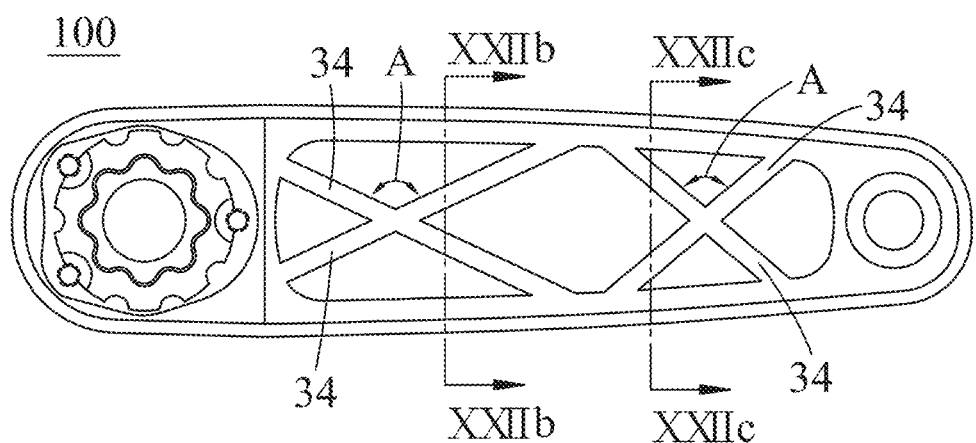
FIG.22(a)
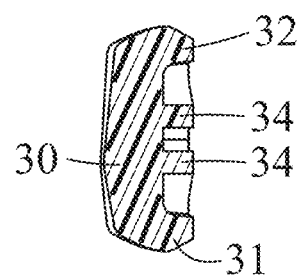 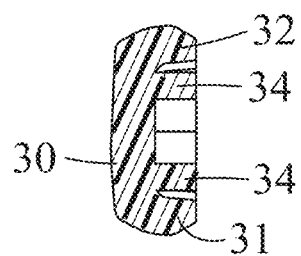
FIG.22(b)　　FIG.22(c)

BICYCLE CRANK ARM

This application claims the benefit of U.S. Provisional Application Ser. No. 63/254,647 filed Oct. 12, 2021, which is referenced herein in its entirety.

FIELD

The disclosure relates to a bicycle crank arm, and more particularly to a bicycle crank arm made from a fiber reinforced thermoplastic material and/or having a reinforcement structure.

BACKGROUND

A conventional bicycle composite crank, or crank arm, is made by a thermoset composite pre-preg, which requires a prior treatment of lay-up or stacking, and a heat molding process. The thermoset composite is no longer re-formable after heat molding, such that products made by this material are not recyclable and reusable. These products may be disposed of by burying or burning and are adverse to environmental protection and preservation. Furthermore, the prior treatment to the thermoset composite pre-preg before heat molding requires significant manpower and working hours, leading to low production efficiency. The yield rate of these products is also easily influenced by the inconsistency of human operation, which causes high scrap rate and increases the cost of this kind of production method.

SUMMARY

According to the disclosure, the bicycle crank includes a first lug, a second lug and a transition region. The first lug is for connecting a spindle. The second lug is for connecting a pedal. The transition region interconnects the first lug and the second lug, and is formed from a fiber reinforced thermoplastic material that includes a fiber component and a thermoplastic component.

BRIEF DESCRIPTION OF THE DRAWINGS

Other features and advantages of the disclosure will become apparent in the following detailed description of the embodiments with reference to the accompanying drawings, of which:

FIG. 22(a) is a side view of another example of the bicycle crank;
FIG. 22(b) is a sectional view of the example in FIG. 22(a) taken along line XXIIb-XXIIb of FIG. 22(a);
FIG. 22(c) is another sectional view of the example in FIG. 22(a) taken along line XXIIc-XXIIc of FIG. 22(a)

DETAILED DESCRIPTION

Figure 1:
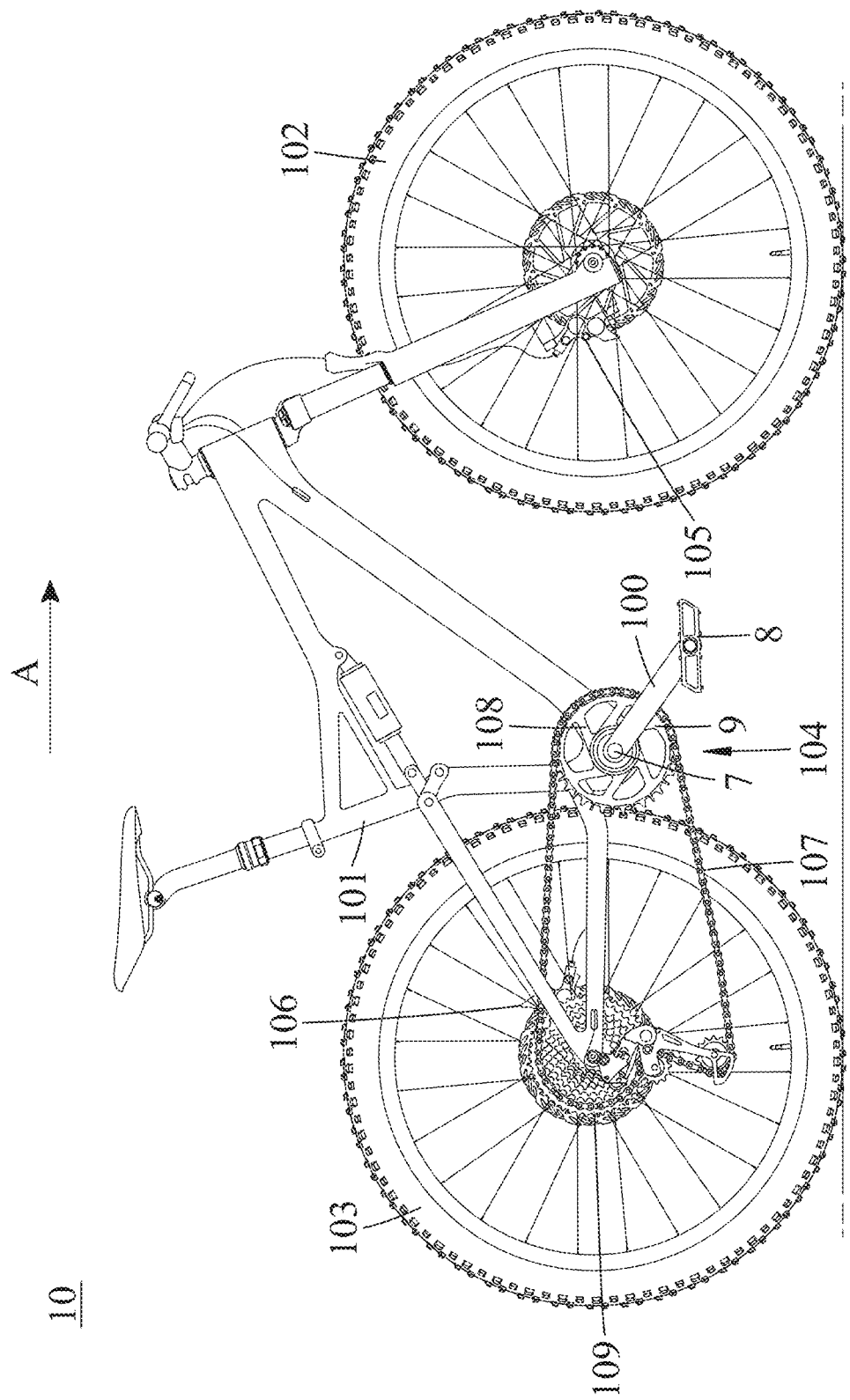
FIG. 1 illustrates a bicycle crank according to the disclosure used in a bicycle.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates a bicycle 10 in which at least a bicycle crank 100 according to the disclosure is used. The bicycle 10 includes a main frame 101, a front wheel 102, a rear wheel 103 and a drivetrain 104. The front wheel 102 and the rear wheel 103 are rotatably connected to the main frame 101. The bicycle 10 further includes a braking system that includes a front brake 105 and a rear brake 106 for respectively braking the front wheel 102 and the rear wheel 103. The drivetrain 104 includes a chain 107, a spindle 7 rotatably mounted to the main frame 101, a front sprocket assembly 108 coaxially mounted to the spindle 7, and a rear sprocket assembly 109 coaxially mounted to the rear wheel 103. Each of the front sprocket assembly 108 and the rear sprocket assembly 109 includes at least one chainring. The direction of arrow "A" indicates a forward direction of movement for the bicycle 10.

In FIG. 1, the bicycle 10 is illustrated as a full-suspension mountain bike with a flat handlebar. However, the bicycle crank 100 according to the disclosure has applications to any kind of bicycles with a single-speed drivetrain or a multi-speed drivetrain which has a shifting system. The shifting system may includes a front shifting unit and/or a rear shifting unit. The braking system and the shifting system may be mechanically controlled or non-mechanically controlled.

Figure 2:
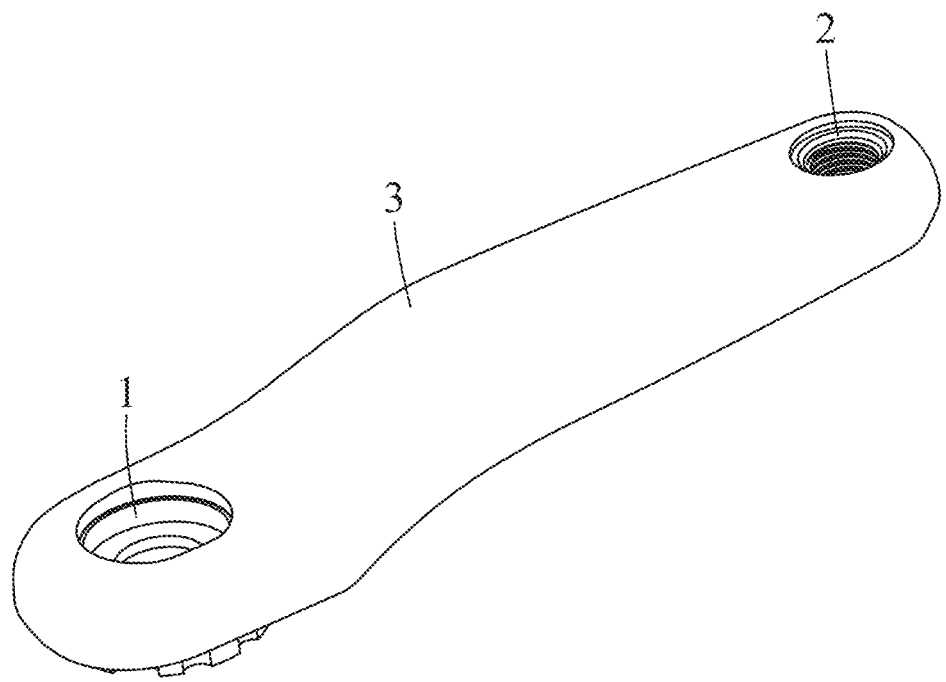
FIG. 2 is a perspective view of the bicycle crank.
Figure 3:
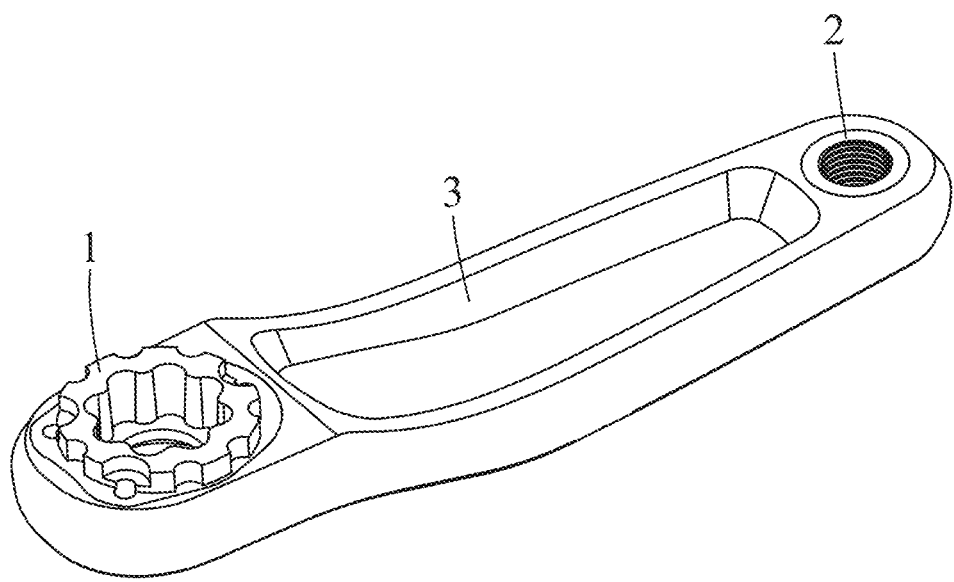
FIG. 3 is another perspective view of the bicycle crank.

Referring further to FIGS. 2 and 3, the bicycle crank 100 includes a pedal attachment portion configured for attachment to a pedal. The pedal attachment portion includes features facilitating the attachment of a pedal. For example, the pedal attachment portion may include an internally threaded portion configured to receive a corresponding externally threaded portion of a pedal. As illustrated in FIGS. 2 and 3, the pedal attachment portion includes a lug, such as a first lug 1 or pedal attachment lug. The first lug 1 includes features for attachment to a pedal, as is described herein. The first lug 1 is formed of a material operable to carry the loading of attachment and removal of the pedal and operation of the bicycle crank 100. In an embodiment, the first lug 1 is formed of material different than other material(s) of the bicycle crank 100. In an embodiment, the first lug 1 may be formed of a metal material. For example, the first lug 1 may be formed of an aluminum or steel-based material.

The bicycle crank 100 also includes a spindle attachment portion. The spindle attachment portion includes features facilitating the attachment of a spindle. For example, the spindle attachment portion may include a section including features configured to receive corresponding features of a spindle to ensure appropriate attachment and torque transfer between the spindle and the bicycle crank 100. As illustrated in FIGS. 2 and 3, the spindle attachment portion includes a lug, such as a second lug 2 or spindle attachment lug. The second lug 2 includes features for attachment to a spindle, as is described herein. The second lug 2 is formed of a material operable to carry the loading of attachment and removal of the spindle and operation of the bicycle crank 100. In an embodiment, the second lug 2 is formed of material different than other material(s) of the bicycle crank 100. In an embodiment, the second lug 2 may be formed of a metal material. For example, the second lug 2 may be formed of an aluminum or steel-based material.

The first lug 1 and the second lug 2 may be formed of the same or different materials. In an embodiment, both the first lug 1 and the second lug 2 are formed of a same metal material, such as an aluminum material.

In an alternate embodiment, the spindle may be formed with or otherwise permanently attached to the bicycle crank 100.

The bicycle crank 100 also includes a transition region 3 that interconnects the pedal attachment portion and the spindle attachment portion. As illustrated in FIGS. 2 and 3, the transition region 3 interconnects the first lug 1 and the second lug 2. The transition region 3 is formed from a different material than the first lug 1 and/or the second lug 2. As described herein, the transition region is formed of a fiber reinforced thermoplastic material (i.e. a thermoplastic composite) that includes a fiber component and a thermoplastic component. The fiber component may be any fiber. For example, the fiber component may be selected from the group consisting of a carbon fiber, a glass fiber, a natural fiber, an aramid fiber, a metal fiber, and combinations thereof. The thermoplastic component may be any thermoplastic component. For example, thermoplastic component may be selected from the group consisting of polypropylene (PP), polyamide (PA), polycarbonate (PC), polyphenylene sulfide (PPS), polyether ether ketone (PEEK), polyetherimide (PEI), and combinations thereof.

In an embodiment, the thermoplastic composite is reformable after heating over the heat-deformation temperature thereof. Also, in an embodiment, the thermoplastic composite may be formed by injection, printing (e.g., 3D printing), and/or hot embossing.

Figure 4:
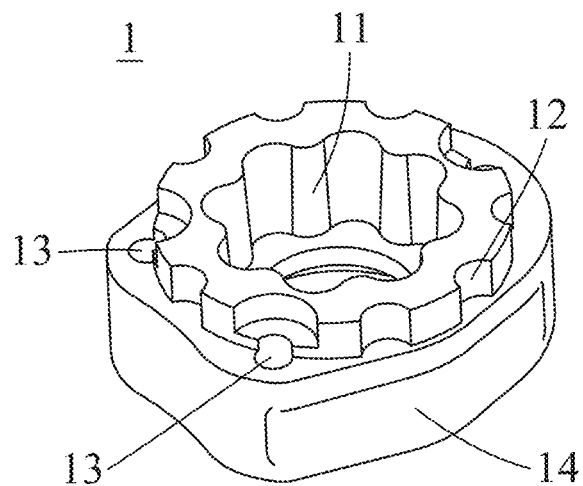
FIG. 4 is a perspective view of a first metal lug of the bicycle crank.
Figure 5:
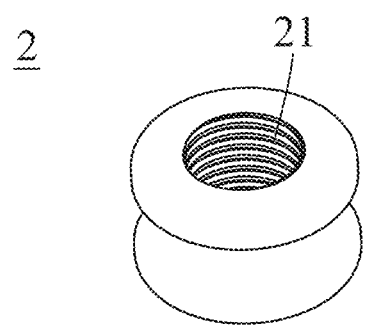
FIG. 5 is a perspective view of a second metal lug of the bicycle crank.

Referring further to FIGS. 4 and 5, the first lug 1 has an inner spline 11 that is co-rotatably engaged with the spindle 7. In one embodiment, the first lug 1 may further have an anti-rotating structure 14 formed at an outer periphery thereof. In one embodiment, the first lug 1 may further have an outer spline 12 that co-rotatably engages with a chainring 9 of the front sprocket assembly 108. In one embodiment, the first lug 1 may further have a plurality of threaded holes 13 that permit a plurality of bolts (not shown) to engage therewith for securing the chainring 9 to the first lug 1. The second lug 2 has a threaded hole 21 for a pedal 8 to be connected thereto. As such, the bicycle crank 100 serves to transfer torque from the pedal 8 to the chainring 9 and the spindle 7.

Figure 6:
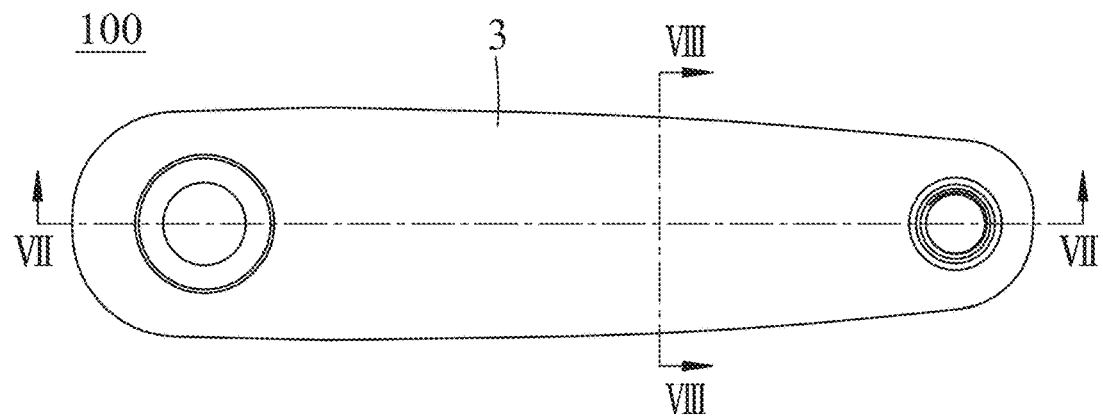
FIG. 6 is a side view of the bicycle crank.
Figure 7:
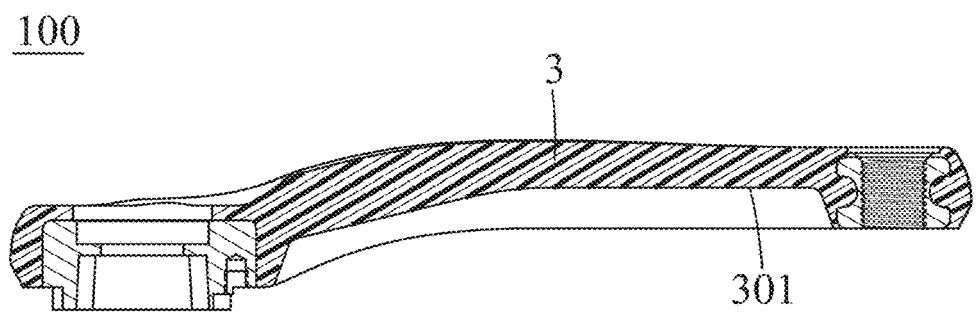
FIG. 7 is a sectional view of the bicycle crank taken along line VII-VII of FIG. 6.
Figure 8:
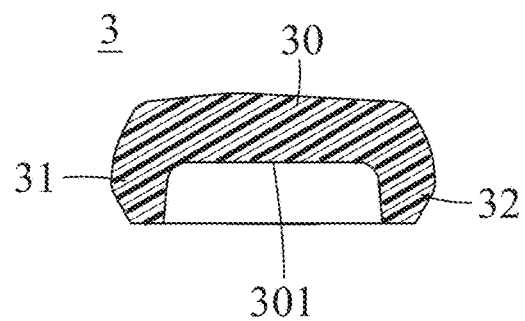
FIG. 8 is another sectional view of the bicycle crank taken along line VIII-VIII of FIG. 6.

Referring to FIGS. 6 to 8, the transition region 3 includes a base section 30. The base section 30 has a base surface 301 extending the length of the transition region 3. In one embodiment, the transition region 3 further includes a first reinforcement structure 31 that extends the length of the transition region 3. In one embodiment, the transition region 3 further includes a second reinforcement structure 32 that extends the length of the transition region 3 and that is spaced apart from the first reinforcement structure 31. In one embodiment, at least one of the first reinforcement structure 31 and the second reinforcement structure 32 extends from the base surface 301 of the base section 30. In one embodiment, at least one of the first reinforcement structure 31 and the second reinforcement structure 32 is a peripheral reinforcement structure that extends from a periphery of the base surface 301 of the base section 30.

Figure 16:
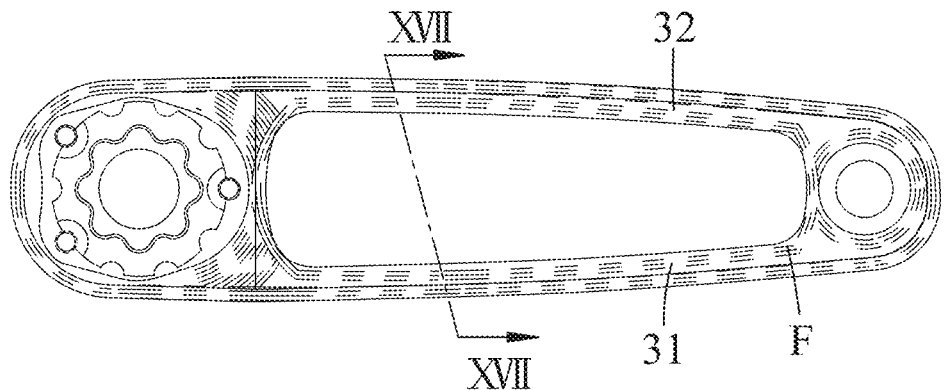
FIG. 16 is a side view of the bicycle crank in FIG. 6, illustrating distribution of a continuous fiber component in a fiber reinforced thermoplastic material forming the bicycle crank.
Figure 17:
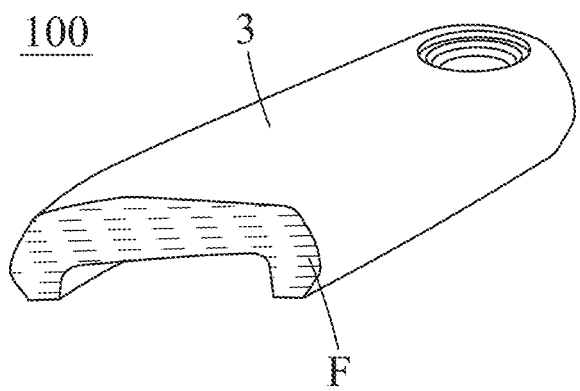
FIG. 17 is a cutaway perspective view illustrating a cross-section of the bicycle crank taken along line XVII-XVII of FIG. 16.

With reference to FIGS. 16 and 17, in this embodiment, at least one of the first reinforcement structure 31 and the second reinforcement structure 32 includes a continuous fiber (F) formed from the fiber component of the fiber reinforced thermoplastic material. In one embodiment, each of the first reinforcement structure 31 and the second reinforcement structure 32 may be configured as a wall section. In one embodiment, at least one of the first reinforcement structure 31 and the second reinforcement structure 32 may include non-continuous fibers.

In some examples, the transition region 3 may further include an intermediate reinforcement structure that is disposed between the first reinforcement structure 31 and the second reinforcement structure 32.

Figure 9:
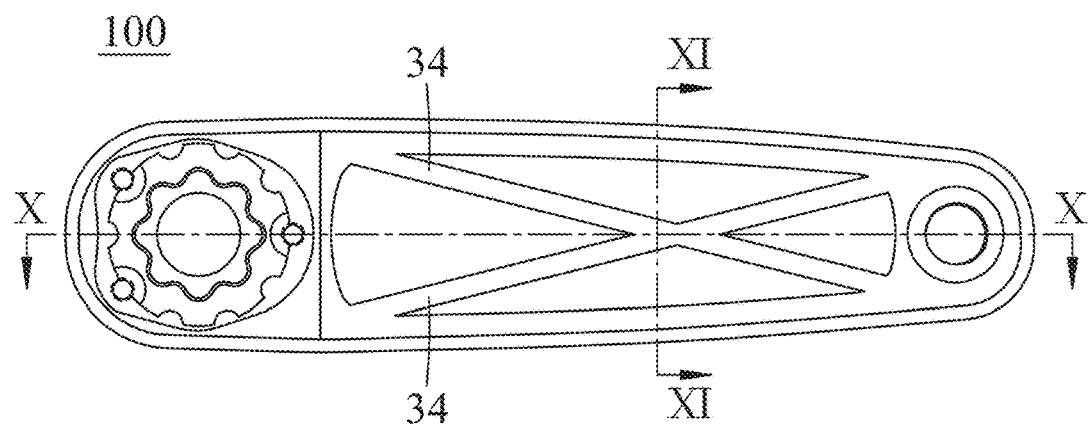
FIG. 9 is a side view of an example of the bicycle crank.
Figure 10:
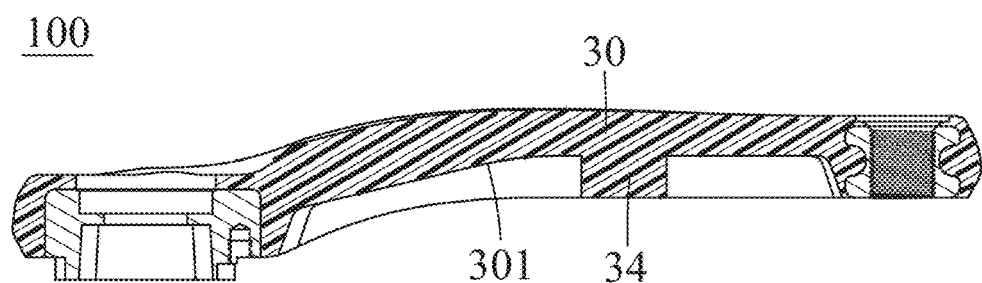
FIG. 10 is a sectional view of the example in FIG. 9 taken along line X-X of FIG. 9.
Figure 11:
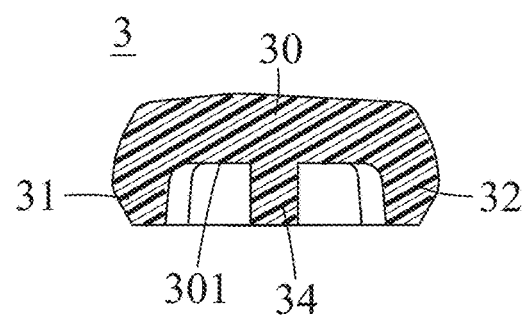
FIG. 11 is another sectional view of the example in FIG. 9 taken along line XI-XI of FIG. 9.
Figure 12:
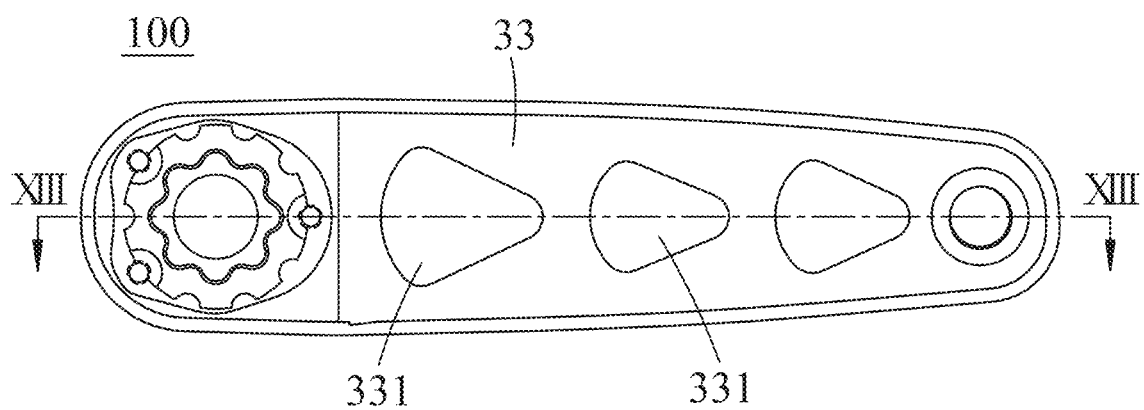
FIG. 12 is a side view of another example of the bicycle crank.
Figure 13:
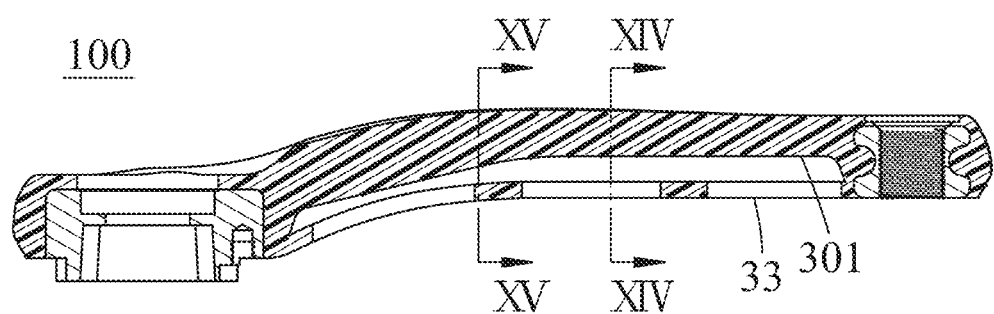
FIG. 13 is a sectional view of the example in FIG. 12 taken along line XIII-XIII of FIG. 12.
Figure 14:
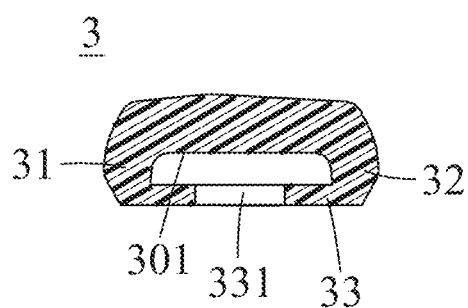
FIG. 14 is another sectional view of the example in FIG. 12 taken along line XIV-XIV of FIG. 13.
Figure 15:
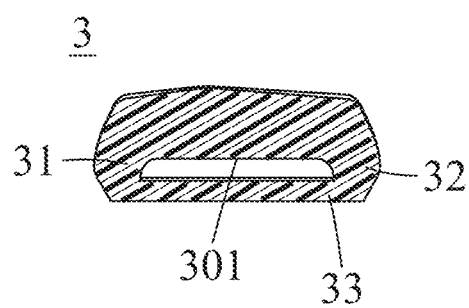
FIG. 15 is still another sectional view of the example in FIG. 12 taken along line XV-XV of FIG. 13.

Referring to FIGS. 9 to 11, in an example, the transition region 3 includes at least one base-extending reinforcement section 34 that extends from the base surface 301. In one embodiment, the base-extending reinforcement section 34 is connected between the first reinforcement structure 31 and the second reinforcement structure 32. The base-extending reinforcement section 34 serves as an intermediate reinforcement structure.

Figure 18:
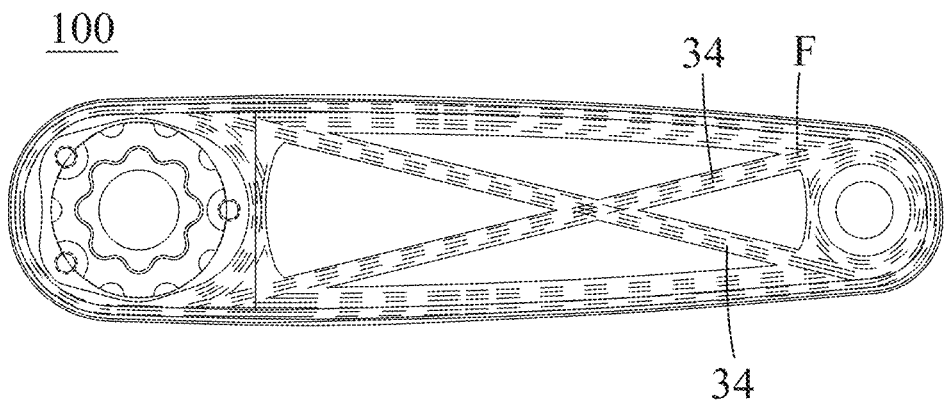
FIG. 18 is a side view of the example in FIG. 9, illustrating distribution of a continuous fiber component in a fiber reinforced thermoplastic material forming the example.

With reference to FIG. 18, the base-extending reinforcement section 34 includes a continuous fiber (F) formed from the fiber component of the fiber reinforced thermoplastic material. In one embodiment, the base-extending reinforcement section 34 may be configured as a rib. In one embodiment, the base-extending reinforcement section 34 may include non-continuous fibers.

In one embodiment, the transition region includes a plurality of intermediate reinforcement structures. For example, the transition region 3 includes base-extending reinforcement sections 34 each extending from the base surface 301. In one embodiment, at least one of the base-extending reinforcement sections 34 may be connected between the first reinforcement structure 31 and the second reinforcement structure 32. In this embodiment, the base-extending reinforcement sections 34 cooperatively form an X-shaped structure. Other structure shapes may also be formed. In one embodiment, the base-extending reinforcement sections 34 are formed from a continuous fiber (F).

Referring to FIGS. 12 to 15, in an example, the transition region includes an intermediate reinforcement structure configured as a spanning reinforcement section 33 that is spaced apart from the base surface 301.

In one embodiment, the spanning reinforcement section 33 is connected to at least one of a distal end of the first reinforcement structure 31 and a distal end of the second reinforcement structure 32.

In one embodiment, the spanning reinforcement section 33 has at least one vacancy 331 formed therethrough. The vacancy 331 serves to reduce the weight of the spanning reinforcement section 33 while maintaining sufficient structural strength of the spanning reinforcement section 33.

Figure 19:
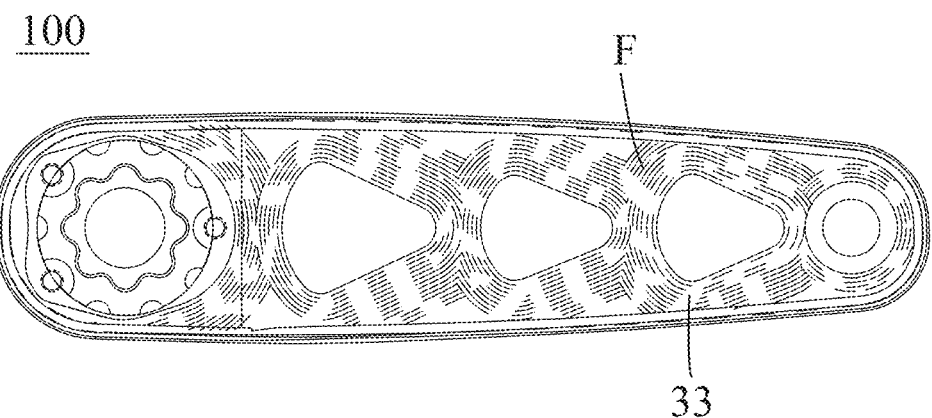
FIG. 19 is a side view of the example in FIG. 12, illustrating distribution of a continuous fiber component in a fiber reinforced thermoplastic material forming the example.

In an embodiment, with reference to FIG. 19, the spanning reinforcement section 33 includes a continuous fiber (F) formed from the fiber component of the fiber reinforced thermoplastic material. In one embodiment, the spanning reinforcement section 33 may be configured as a wall section. In one embodiment, the spanning reinforcement section 33 may include non-continuous fibers.

Figure 20A:
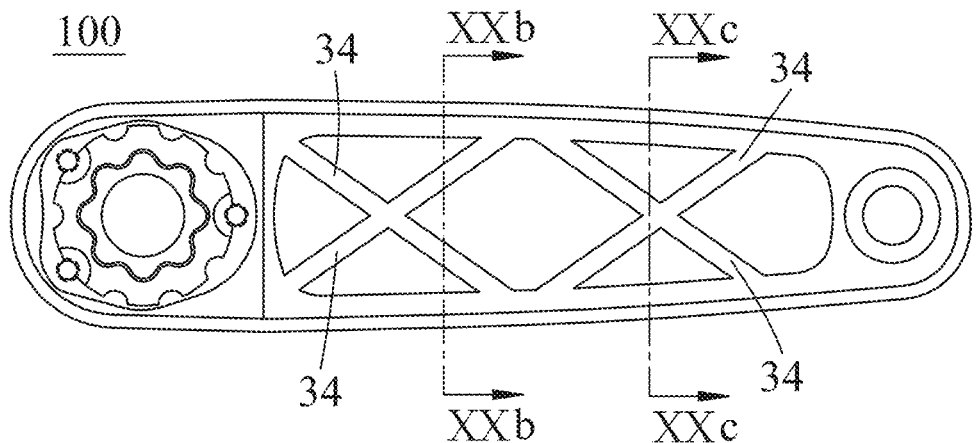
FIG. 20(a) is a side view of another example of the bicycle crank.
Figures 20B, 20C:
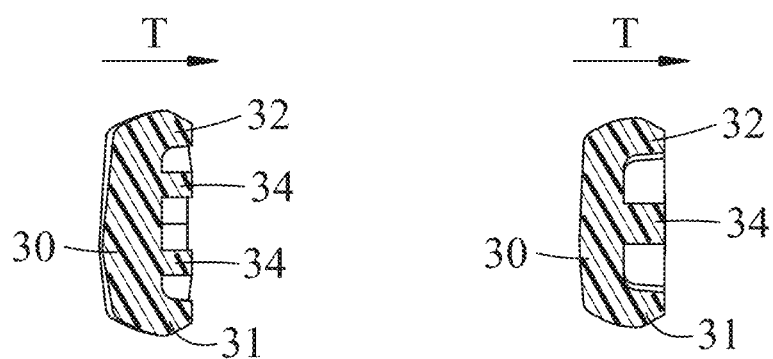
FIG. 20(b) is a sectional view of the example in FIG. 20(a) taken along line XXb-XXb of FIG. 20(a)
FIG. 20(c) is another sectional view of the example in FIG. 20(a) taken along line XXc-XXc of FIG. 20(a)

Referring to FIG. 20(a), in an example, the transition region 3 includes a plurality of the base-extending reinforcement sections 34 extending from the base section 30, disposed between the first reinforcement structure 31 and the second reinforcement structure 32, and cooperatively forming a plurality of X-shaped structures that are arranged along an extending direction of the transition region 3. With particular reference to FIG. 20(b) and FIG. 20(c), a height of each of the base-extending reinforcement sections 34 in a transverse direction (T) may be different from those of the others, or may vary along the extending direction of the transition region 3, so that depths (in the transverse direction (T)) of the spaces defined among the base-extending reinforcement sections 34 vary along the extending direction of the transition region 3.

Figure 21A:
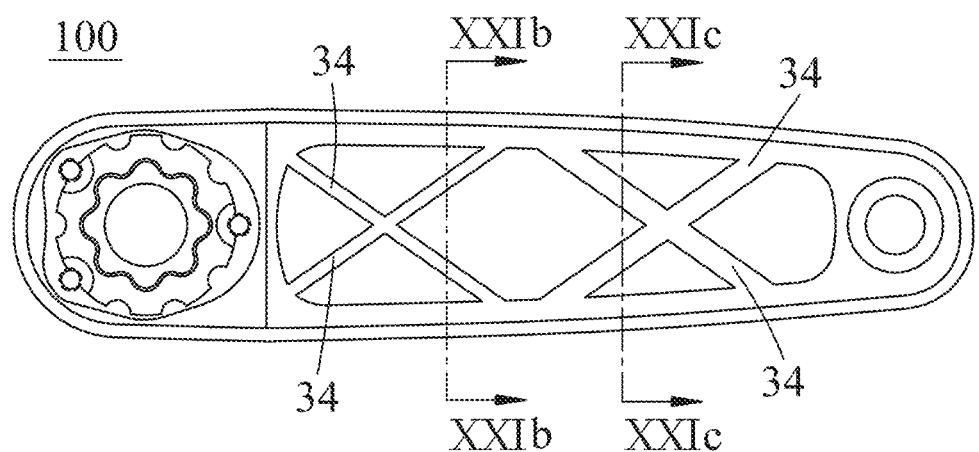
FIG. 21(a) is a side view of another example of the bicycle crank.
Figure 21B:
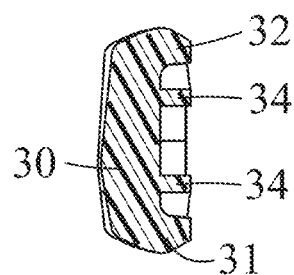
FIG. 21(b) is a sectional view of the example in FIG. 21(a) taken along line XXIb-XXIb of FIG. 21(a)
Figure 21C:
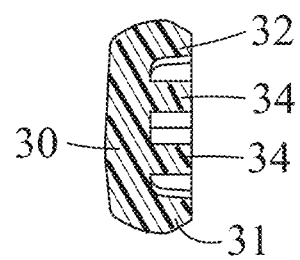
FIG. 21(c) is another sectional view of the example in FIG. 21(a) taken along line XXIc-XXIc of FIG. 21(a)

Referring to FIGS. 21(a) to 21(c), in an example, a width of each of the base-extending reinforcement sections 34 that extend from the base section 30 and that are disposed between the first reinforcement structure 31 and the second reinforcement structure 32 may be different from those of the others.

Referring to FIGS. 22(a) to 22(c), in an example, the cross angle (A) of each of the X-shaped structures formed by the base-extending reinforcement sections 34 that extend from the base section 30 and that are disposed between the first reinforcement structure 31 and the second reinforcement structure 32 may be different from that of the other(s).

Figure 23A:
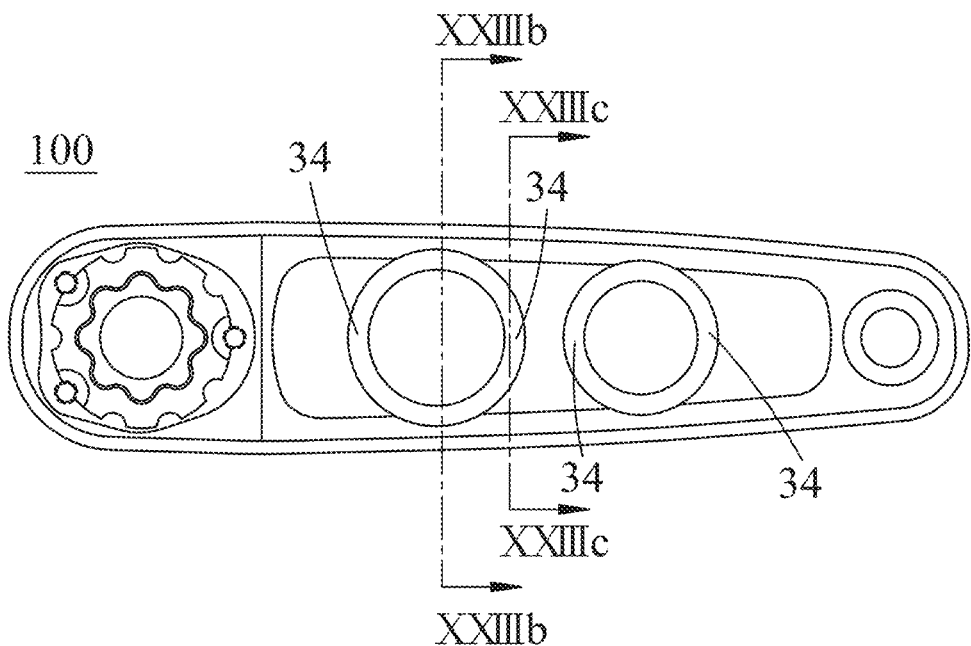
FIG. 23(a) is a side view of another example of the bicycle crank.
Figure 23B:
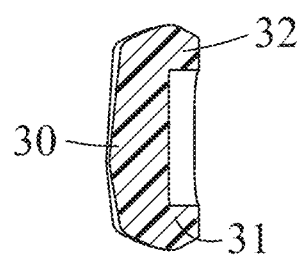
FIG. 23(b) is a sectional view of the example in FIG. 23(a) taken along line XXIIIb-XXIIIb of FIG. 23(a)
Figure 23C:
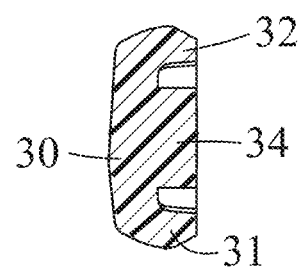
FIG. 23(c) is another sectional view of the example in FIG. 23(a) taken along line XXIIIc-XXIIIc of FIG. 23(a)

Referring to FIGS. 23(a) to 23(c), in an example, the transition region 3 includes a plurality of the base-extending reinforcement sections 34 each extending from the base section 30 and being disposed between the first reinforcement structure 31 and the second reinforcement structure 32, and each being arc-shaped. In one embodiment, each of the base-extending reinforcement sections 34 is connected between the first reinforcement structure 31 and the second reinforcement structure 32. The base-extending reinforcement sections 34 cooperatively form at least one annular structure. Other structure shapes may also be formed.

Referring to FIG. 24(a) to FIG. 25(b), in an example, the transition region 3 includes an intermediate reinforcement structure configured as an intermediate body section 35. The intermediate body section 35 extends from the base surface 301 of the base section 30 and is connected between the first reinforcement structure 31 and the second reinforcement structure 32. In one embodiment, the intermediate body section 35 defines a plurality of intermediate vacancies 351 therein. The intermediate vacancies 351 serve to reduce the weight of the intermediate body section 35 while maintaining sufficient structural strength of the intermediate body section 35. In one embodiment, the vacancies 351 may extend through the intermediate body section 35.

Figure 24A:
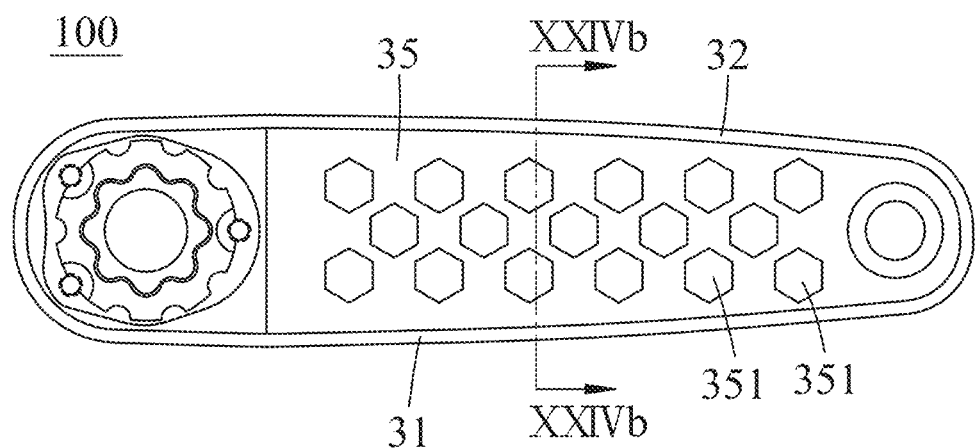
FIG. 24(a) is a side view of another example of the bicycle crank.
Figure 24B:
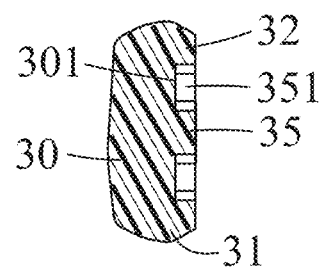
FIG. 24(b) is a sectional view of the example in FIG. 24(a) taken along line XXIVb-XXIVb of FIG. 24(a)

With particular reference to FIGS. 24(a) and 24(b), in one embodiment, the intermediate vacancies 351 are configured as hexagonal holes, and are arranged in such a manner that the intermediate body section 35 has a honeycomb structure.

Figure 25A:
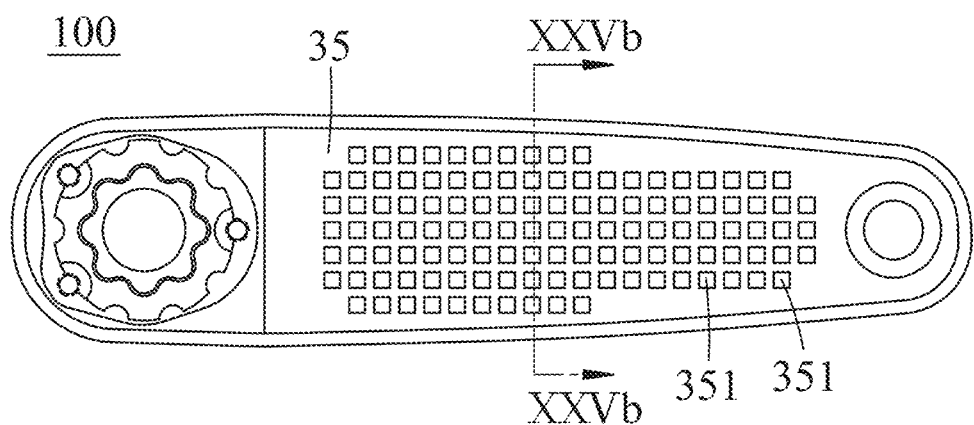
FIG. 25(a) is a side view of another example of the bicycle crank.
Figure 25B:
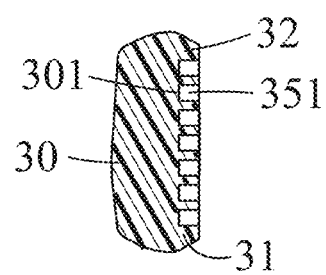
FIG. 25(b) is a sectional view of the example in FIG. 25(a) taken along line XXVb-XXVb of FIG. 25(a)

With particular reference to FIGS. 25(a) and 25(b), in one embodiment, the intermediate vacancies 351 may be rectangular, circular, elliptic, or of other shapes.

Figure 26:
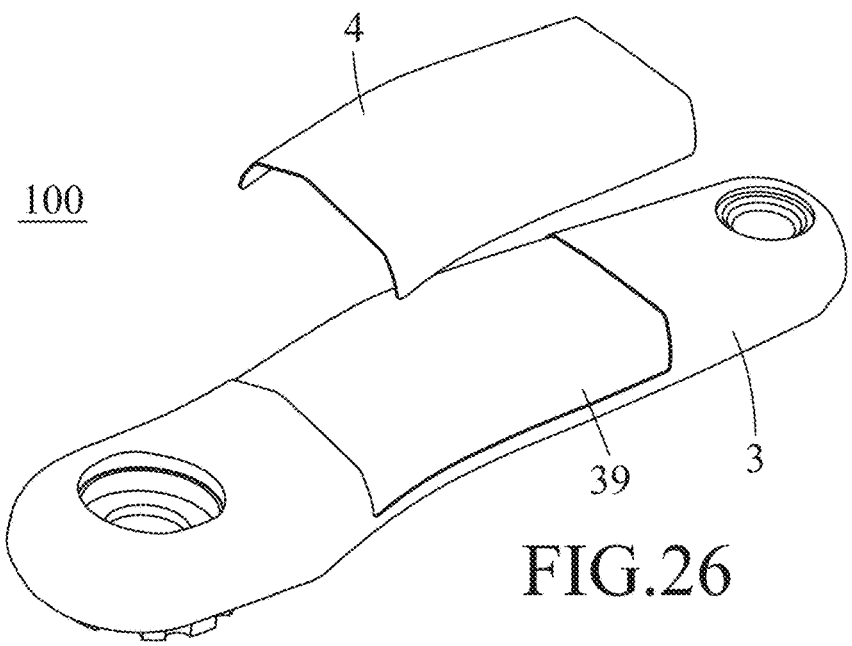
FIG. 26 is a partly exploded perspective view illustrating another example of the bicycle crank.
Figure 27:
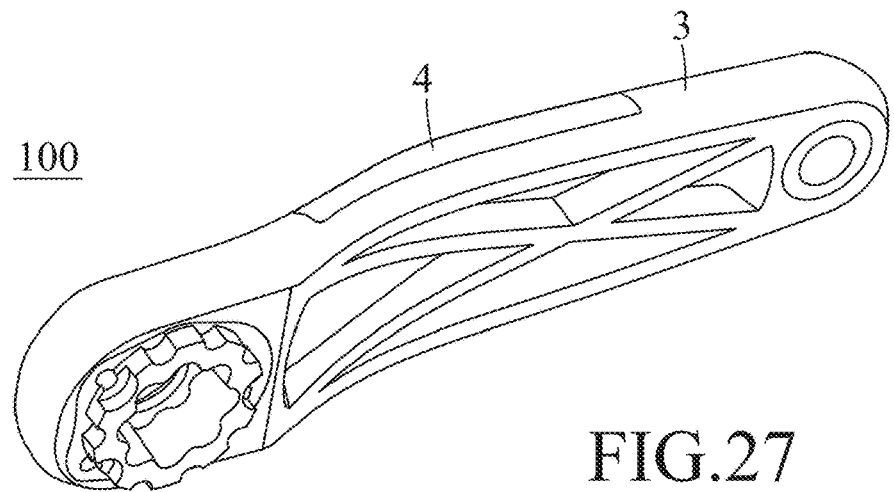
FIG. 27 is a perspective view of the example in FIG. 26.
Figure 28:
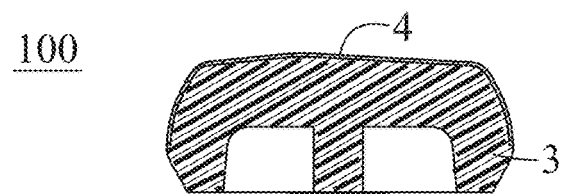
FIG. 28 is a sectional view of the example in FIG. 26.

Referring to FIGS. 26 to 28, in an example, the bicycle crank 100 further includes a shell 4 that is formed of a material different from the thermoplastic component of the fiber reinforced thermoplastic material. The shell 4 may cover at least a portion of the transition region 3 to protect the portion of the transition region 3. In one embodiment, the transition region 3 is formed with a mounting recess 39 to which the shell 4 is mounted. In another embodiment, the material forming the shell 4 has a hardness higher than that of the thermoplastic component of the fiber reinforced thermoplastic material. In yet another embodiment, the material forming the shell 4 is metal. The shell 4 may be mounted to the transition region 3 by insert molding, hot pressing, resin transmitting molding, or adhesion.

Figure 29:
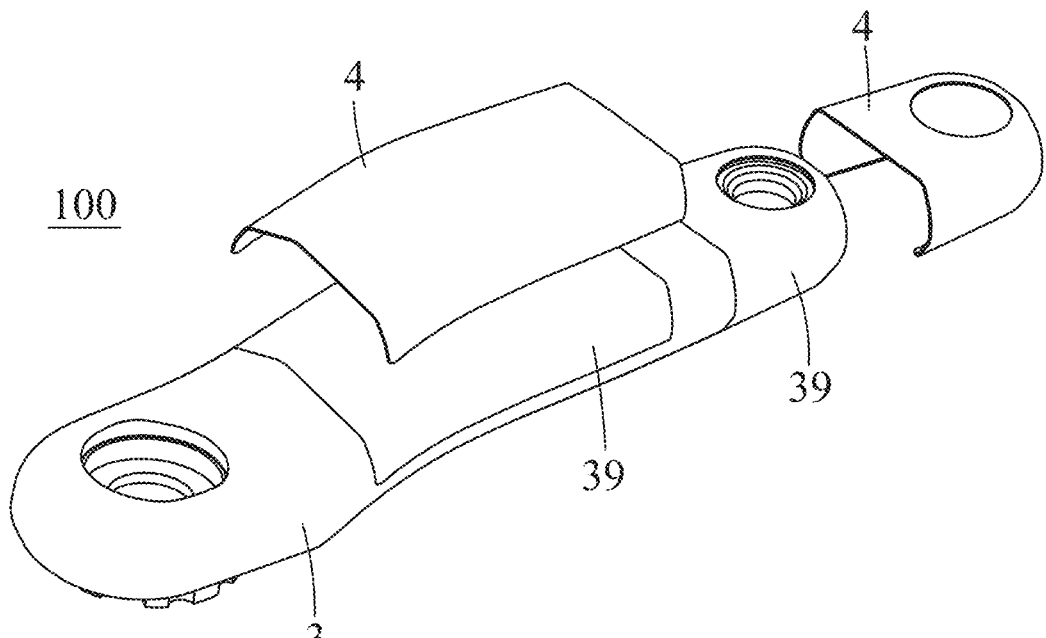
FIG. 29 is a partly exploded perspective view illustrating another example of the bicycle crank.

Referring to FIG. 29, in an example, the bicycle crank 100 may include a plurality of the shells 4. In one embodiment, the transition region 3 is formed with a plurality of the mounting recesses 39 to which the shells 4 are respectively mounted.

Figure 30:
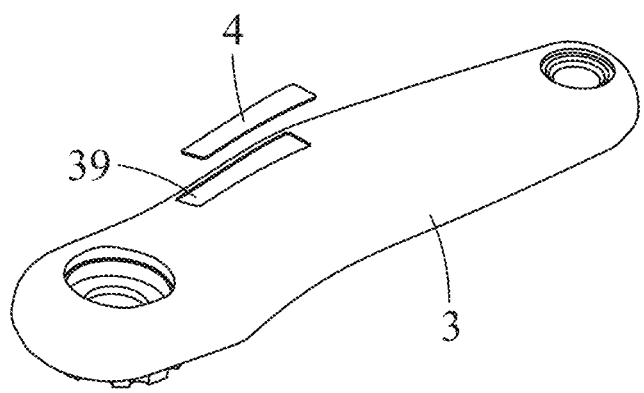
FIG. 30 is a partly exploded perspective view illustrating another example of the bicycle crank.

Referring to FIG. 30, in an example, the shell 4 may serve as a decorative accessory. In an embodiment, the transition region 3 is formed with the mounting recess 39 for the shell 4 to be mounted.

In summary, since the thermoplastic composite is reformable after heating over the heat-deformation temperature thereof, the bicycle crank according to the disclosure is recyclable and reusable. In addition, since the thermoplastic composite can be formed by injection, printing, and hot embossing, the yield rate of the bicycle crank according to the disclosure is enhanced compared with that of the conventional thermoset composite bicycle crank.

Lastly, based on the loading test conducted for the bicycle crank of the present disclosure (data not shown), the applicant has found that the bicycle crank made from the thermoplastic composite (i.e. the fiber reinforced thermoplastic material) still has sufficient structural strength in addition to the recyclability and reusability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A bicycle crank comprising:
   a first lug adapted to connect a spindle;
   a second lug adapted to connect a pedal; and
   a transition region interconnecting the first lug and the second lug, the transition region being formed from a fiber reinforced thermoplastic material that includes a fiber component and a thermoplastic component, wherein the transition region comprises a base section that has a base surface extending a length of the transition region, a first reinforcement structure that extends the length of the transition region from the base surface, a second reinforcement structure that extends the length of the transition region from the base surface, is the second reinforcement structure being spaced apart from the first reinforcement structure; and an intermediate reinforcement structure that is disposed between the first reinforcement structure and the second reinforcement structure.

2. The bicycle crank as claimed in claim 1, wherein at least one of the first reinforcement structure and the second reinforcement structure is a peripheral reinforcement structure that extends from a periphery of the base section.

3. The bicycle crank as claimed in claim 1, wherein the first reinforcement structure includes a continuous fiber formed from the fiber component of the fiber reinforced thermoplastic material.

4. The bicycle crank as claimed in claim 1, wherein the intermediate reinforcement structure is configured as a spanning reinforcement section that is spaced apart from the base surface.

5. The bicycle crank as claimed in claim 4, wherein the spanning reinforcement section has at least one vacancy formed therethrough.

6. The bicycle crank as claimed in claim 4, wherein the spanning reinforcement section includes a continuous fiber formed from the fiber component of the fiber reinforced thermoplastic material.

7. The bicycle crank as claimed in claim 1, wherein the intermediate reinforcement structure is configured as a base-extending reinforcement section that extends from the base surface and that is connected between the first reinforcement structure and the second reinforcement structure.

8. The bicycle crank as claimed in claim 7, wherein the transition region comprises a plurality of the base-extending reinforcement sections each extending from the base surface and being connected between the first reinforcement structure and the second reinforcement structure, the base-extending reinforcement sections cooperatively forming an X-shaped structure.

9. The bicycle crank as claimed in claim 7, wherein the base-extending reinforcement section includes a continuous fiber formed from the fiber component of the fiber reinforced thermoplastic material.

10. The bicycle crank as claimed in claim 7, wherein the transition region comprises a plurality of the base-extending reinforcement sections each extending from the base surface and being connected between the first reinforcement structure and the second reinforcement structure, the base-extending reinforcement sections cooperatively forming a plurality of X-shaped structures that are arranged along an extending direction of the transition region.

11. The bicycle crank as claimed in claim 7, wherein the transition region comprises a plurality of the base-extending reinforcement sections each extending from the base surface and being connected between the first reinforcement structure and the second reinforcement structure, the base-extending reinforcement sections cooperatively forming an annular structure.

12. The bicycle crank as claimed in claim 1, wherein the intermediate reinforcement structure is configured as an intermediate body section that extends from the base surface and that is connected between the first reinforcement structure and the second reinforcement structure, the intermediate body section defining a plurality of intermediate vacancies therein.

13. The bicycle crank as claimed in claim 12, wherein the intermediate vacancies are configured as hexagonal holes, and are arranged in such a manner that the intermediate body section has a honeycomb structure.

14. The bicycle crank as claimed in claim 1, further comprising at least one shell that is formed of a material different from the thermoplastic component of the fiber reinforced thermoplastic material and that covers a portion of the transition region.

15. The bicycle crank as claimed in claim 14, wherein the material forming the shell has a hardness higher than that of the thermoplastic component of the fiber reinforced thermoplastic material.

16. The bicycle crank as claimed in claim 15, wherein the material forming the shell is metal.

17. The bicycle crank as claimed in claim 1, wherein the fiber component is selected from the group consisting of a carbon fiber, a glass fiber, a natural fiber, an aramid fiber, a metal fiber, and combinations thereof, the thermoplastic component being selected from the group consisting of polypropylene, polyamide, polycarbonate, polyphenylene sulfide, polyether ether ketone, polyetherimide, and combinations thereof.

* * * * *